(12) United States Patent
Espine et al.

(10) Patent No.: US 12,062,113 B2
(45) Date of Patent: Aug. 13, 2024

(54) DYNAMIC PATTERN GENERATOR

(71) Applicant: International Business Machines Corporation, Armonk, NY (US)

(72) Inventors: Danielle Espine, Jamaica, NY (US); Jennifer M. Hatfield, San Francisco, CA (US); Ourania Svoronou, New York, NY (US); Ewa Karweta, New York, NY (US); Lucia Larise Stavarache, Columbus, OH (US)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 17/569,676

(22) Filed: Jan. 6, 2022

(65) Prior Publication Data

US 2023/0215056 A1     Jul. 6, 2023

(51) Int. Cl.
| G06T 11/00 | (2006.01) |
|---|---|
| G06T 3/40 | (2024.01) |
| G06T 11/80 | (2006.01) |

(52) U.S. Cl.
CPC ............... *G06T 11/00* (2013.01); *G06T 3/40* (2013.01)

(58) Field of Classification Search
CPC ......... G06T 11/00; G06T 11/80; H04L 65/403
See application file for complete search history.

(56) References Cited

U.S. PATENT DOCUMENTS

| 6,735,568 | B1 | 5/2004 | Buckwalter |
|---|---|---|---|
| 7,603,413 | B1 | 10/2009 | Herold |
| 8,146,005 | B2 | 3/2012 | Jones |
| 8,195,673 | B2 | 6/2012 | Wilf |
| 8,285,654 | B2 | 10/2012 | Bajrach |
| 8,731,996 | B2 | 5/2014 | Kumagai |
| 8,954,343 | B2 | 2/2015 | Wright |
| 9,671,942 | B2 | 6/2017 | Fleury |
| 10,042,536 | B2 | 8/2018 | Goossens |
| 10,210,647 | B2 | 2/2019 | Guo |
| 10,419,375 | B1 | 9/2019 | Sokolov |

(Continued)

FOREIGN PATENT DOCUMENTS

| CN | 1237505 C | 1/2006 |
|---|---|---|
| CN | 112684881 A | 4/2021 |

(Continued)

OTHER PUBLICATIONS

Bender et al., "Sharing Personalized Data in an Electronic Online Group User Session", U.S. Appl. No. 17/035,760, filed Sep. 29, 2020.

(Continued)

*Primary Examiner* — Yi Yang
(74) *Attorney, Agent, or Firm* — Monchai Chuaychoo (57) ABSTRACT

An approach for creating avatars of team members on a project team. The approach retrieves data associated with team members of a project team. The approach creates avatars of the team members based on the data. The approach displays the avatars to the team members, requesting permission to from the team members to use the avatars to represent the team members. With permission, the approach creates a plurality of avatars of different dimensions to use on different platforms. The approach displays the avatars during online team meetings as a representation of the respective team member.

20 Claims, 6 Drawing Sheets

(56) References Cited

U.S. PATENT DOCUMENTS

| | | | |
|---|---|---|---|
| 10,528,801 | B2 | 1/2020 | Arbatman |
| 10,594,757 | B1 | 3/2020 | Shevchenko |
| 10,679,130 | B2 | 6/2020 | Pinel |
| 11,165,725 | B1 | 11/2021 | Silverstein |
| 2004/0181376 | A1 | 9/2004 | Fables |
| 2009/0157482 | A1* | 6/2009 | Jung ............... G06Q 30/02 705/7.33 |
| 2010/0070859 | A1* | 3/2010 | Shuster ............ G06T 15/08 715/706 |
| 2010/0205541 | A1 | 8/2010 | Rapaport |
| 2011/0213211 | A1 | 9/2011 | Stevens |
| 2012/0265811 | A1 | 10/2012 | Bist |
| 2013/0096970 | A1 | 4/2013 | Boss |
| 2014/0129343 | A1 | 5/2014 | Finster |
| 2015/0051451 | A1 | 2/2015 | Kido |
| 2015/0256634 | A1 | 9/2015 | Bastide |
| 2015/0350737 | A1* | 12/2015 | Anderson ......... G06F 40/169 348/564 |
| 2016/0128617 | A1 | 5/2016 | Morris |
| 2016/0203433 | A1 | 7/2016 | Chen |
| 2017/0069124 | A1 | 3/2017 | Tong |
| 2017/0147202 | A1 | 5/2017 | Donohue |
| 2017/0262431 | A1 | 9/2017 | Alam |
| 2017/0262809 | A1 | 9/2017 | Martin |
| 2017/0302709 | A1* | 10/2017 | Jones ............. G06F 3/04817 |
| 2017/0364857 | A1 | 12/2017 | Suri |
| 2018/0101776 | A1 | 4/2018 | Osotio |
| 2018/0181854 | A1 | 6/2018 | Koukoumidis |
| 2018/0211654 | A1* | 7/2018 | Jacobson ......... H04L 51/216 |
| 2018/0254914 | A1 | 9/2018 | Bastide |
| 2018/0286099 | A1 | 10/2018 | Kozloski |
| 2019/0147367 | A1* | 5/2019 | Bellamy ............ G06N 5/022 706/12 |
| 2019/0297035 | A1 | 9/2019 | Fox |
| 2019/0325632 | A1 | 10/2019 | Rinker |
| 2020/0126670 | A1 | 4/2020 | Bender |
| 2020/0134541 | A1 | 4/2020 | Ebner |
| 2020/0202603 | A1* | 6/2020 | Choi ............... G06F 3/011 |
| 2020/0298131 | A1 | 9/2020 | Pinto |
| 2021/0083889 | A1 | 3/2021 | Chakra |
| 2021/0234823 | A1 | 7/2021 | Levkovitz |
| 2022/0164544 | A1 | 5/2022 | Shimizu |
| 2022/0284380 | A1 | 9/2022 | Goetzke |
| 2023/0214741 | A1 | 7/2023 | Hatfield |
| 2023/0214742 | A1 | 7/2023 | Karweta |

FOREIGN PATENT DOCUMENTS

| | | | |
|---|---|---|---|
| KR | 1020050015584 | A | 2/2005 |
| KR | 100663921 | B1 | 12/2006 |
| WO | 2005029414 | A1 | 3/2005 |
| WO | 2008151421 | A1 | 12/2008 |
| WO | 2012153320 | A2 | 11/2012 |
| WO | 2019059755 | A1 | 3/2019 |

OTHER PUBLICATIONS

Hatfield et al., "Intelligent Participant Matching and Assessment Assistant", U.S. Appl. No. 17/569,638, filed Jan. 6, 2022.

Karweta et al., "Intelligent Personality Matching With Virtual Reality", U.S. Appl. No. 17/569,711, filed Jan. 6, 2022.

List of IBM Patents or Patent Applications Treated as Related, Filed Jan. 6, 2022, 2 pages.

Franklin, A.E., Thielke, L., Gilbert, G.E. et al. TIDES: examining the influence of temporal individual differences on multitasking in educational simulation. Adv Simul 5, 31 (2020). https://doi.org/10.1186/s41077-020-00144-(Year: 2020), U.S. Appl. No. 17/569,711 dated Apr. 6, 2023.

"100% Free Online Personality Test", Personality Perfect, downloaded from the internet on Oct. 14, 2021, 6 pages, <https://www.personalityperfect.com/>.

"Intelligent Cognitive Assistants", Semiconductor Research Corporation (SRC), Workshop Summary and Recommendations, May 12-13, 2016, 42 pages.

"Psychometric Tests & Personality Assessments", Psychometrics, downloaded from the internet on Oct. 14, 2021, 8 pages, <https://www.psychometrics.com/>.

"Pure Matching—Revolutionary matching algorithm", Pure Matching, downloaded from the internet on Oct. 14, 2021, 1 page, <https://www.purematching.com/>.

"System and method predict candidate fitment to a team's potential based on Team dynamics", An IP.com Prior Art Database Technical Disclosure, Authors et. al.: Disclosed Anonymously, IP.com No. IPCOM000259577D, IP.com Electronic Publication Date: Aug. 23, 2019, 7 pages.

Beal, Brendan, "Teaching Group Dynamics Using Virtual Reality," The New Social Worker, downloaded from the Internet on Oct. 14, 2021, 5 pages, <https://www.socialworker.com/feature-articles/technology-articles/teaching-group-dynamics-using-virtual-reality/>.

Fiore et al., "Technology as Teammate: Examining the Role of External Cognition in Support of Team Cognitive Processes", Frontiers in Psychology, Published: Oct. 7, 2016, doi: 10.3389/fpsyg.2016.01531, 17 pages.

Mahardhika et al., "Team cognition model based on mutual beliefs and mental subgrouping", Journal of Interaction Science (2016) 4:1, Published online: Feb. 1, 2016, DOI 10.1186/s40166-016-0014-6, 10 pages.

Mell et al., "The NIST Definition of Cloud Computing", National Institute of Standards and Technology, Special Publication 800-145, Sep. 2011, 7 pages.

Niebuhr et al., "Virtual reality simulations as a new tool for practicing presentations and refining public-speaking skills," Proceedings of the 9th International Conference on Speech Prosody 2018, Jun. 13-16, 2018, Poznan, Poland, DOI: 10.21437/SpeechProsody.2018-63, 6 pages.

Rammstedt et al., "Relationships between Personality and Cognitive Ability: A Facet-Level Analysis", Journal of Intelligence 2018, 6, 28, doi:10.3390/jintelligence6020028, Published: May 18, 2018, 13 pages.

Storm, Susan, "How Each Myers-Briggs® Type Reacts to Stress (and How to Help!)—Psychology Junkie", downloaded from the Internet on Sep. 27, 2020, 30 pages, <https://www.psychologyjunkie.com/2015/08/02/how-each-mbti-type-reacts-to-stress-and-how-to-help/>.

Tidbury et al., "Initial evaluation of a virtual reality bomb-defusing simulator for development of undergraduate healthcare student communication and teamwork skills", BMJ Simulation and Technology Enhanced Learning, Published Online First Dec. 20, 2019, doi: 10.1136/bmjstel-2019-000446, pp. 229-231.

Tudor et al., "Virtual Audience Customization for Public Speaking Training Procedures", IEEE Virtual Reality Mar. 16-20, 2013, Orlando, FL, USA, pp. 61-62.

* cited by examiner

DYNAMIC PATTERN GENERATOR

TECHNICAL FIELD

The present invention relates generally to workplace efficiency, and specifically, to creating remote team member visual representations based on data driven insights and patterns.

BACKGROUND

Uncomfortable and inefficient workplaces are created when people are not performing or communicating at their best due to remote workplace interaction, personality and/or work method conflicts. This ineffective interaction can result in low team morale, risk for project schedules and unhappy customers/clients. When working in a remote team environment, understanding a team member becomes more difficult because of a disconnect with personalities and emotions based on a remote meeting environment. Accordingly, team and project productivity can decline because of team members become out of touch with each other with respect to these characteristics.

BRIEF SUMMARY

According to an embodiment of the present invention, a computer-implemented method for creating a team member avatar, the computer-implemented method comprising: retrieving, by one or more processors, data associated with a team member; creating, by the one or more processors, an avatar, based on the data, representing the team member; displaying, by the one or more processors, the avatar to the team member and requesting confirmation from the team member to use the avatar as a representation of the team member; responsive to receiving confirmation to use the avatar, creating, by the one or more processors, a plurality of avatar representations with different dimensions to display on different platforms, respectively; and displaying, by the one or more processors, the avatar during online team meetings as a representation of the team member.

According to an embodiment of the present invention, a computer program product for creating a team member avatar, the computer program product comprising: one or more non-transitory computer readable storage media and program instructions stored on the one or more non-transitory computer readable storage media, the program instructions comprising: program instructions to retrieve data associated with a team member; program instructions to create an avatar, based on the data, representing the team member; program instructions to display the avatar to the team member and request confirmation from the team member to use the avatar as a representation of the team member; responsive to receiving confirmation to use the avatar, program instructions to create a plurality of avatar representations with different dimensions to display on different platforms, respectively; and program instructions to display the avatar during online team meetings as a representation of the team member.

According to an embodiment of the present invention, a computer system for creating a team member avatar, the computer system comprising: one or more computer processors; one or more non-transitory computer readable storage media; and program instructions stored on the one or more non-transitory computer readable storage media, the program instructions comprising: program instructions to retrieve data associated with a team member; program instructions to create an avatar, based on the data, representing the team member; program instructions to display the avatar to the team member and request confirmation from the team member to use the avatar as a representation of the team member; responsive to receiving confirmation to use the avatar, program instructions to create a plurality of avatar representations with different dimensions to display on different platforms, respectively; and program instructions to display the avatar during online team meetings as a representation of the team member.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of optimizing workplace team efficiency based on team member dynamic pattern generation. Embodiments of the present invention can establish a common language between team members, providing team members the capability to know and understand each other beyond what a remote meeting environment can capture and communicate, e.g., simulate a face-to-face office meeting interaction. Embodiments of the present invention can provide visual representations of team members based on data driven insights and patterns that visually adjust based on key persona factors, collaboration metrics, and team engagement while also creating a dynamic interaction through emotional recognition.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
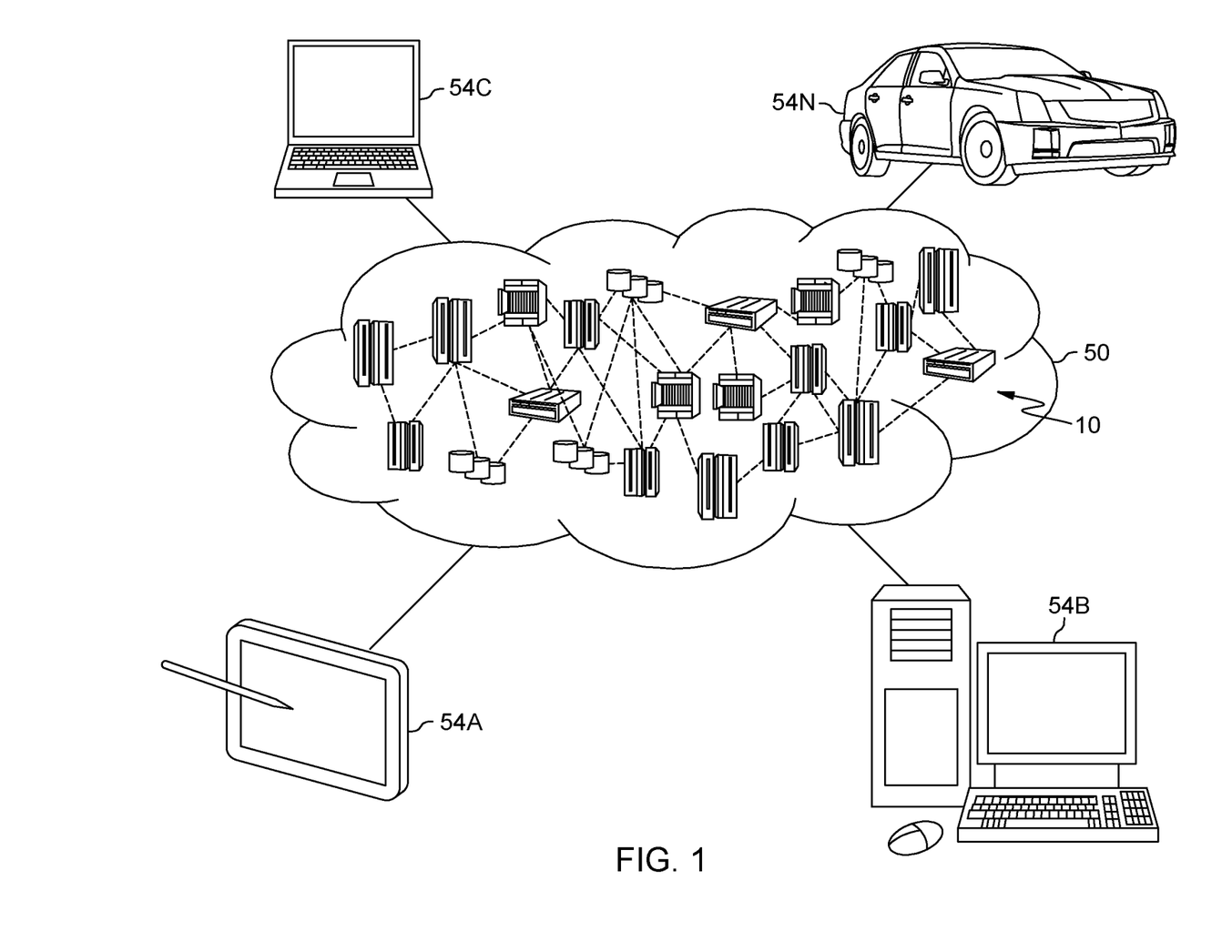
FIG. 1 depicts a cloud computing environment, according to embodiments of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
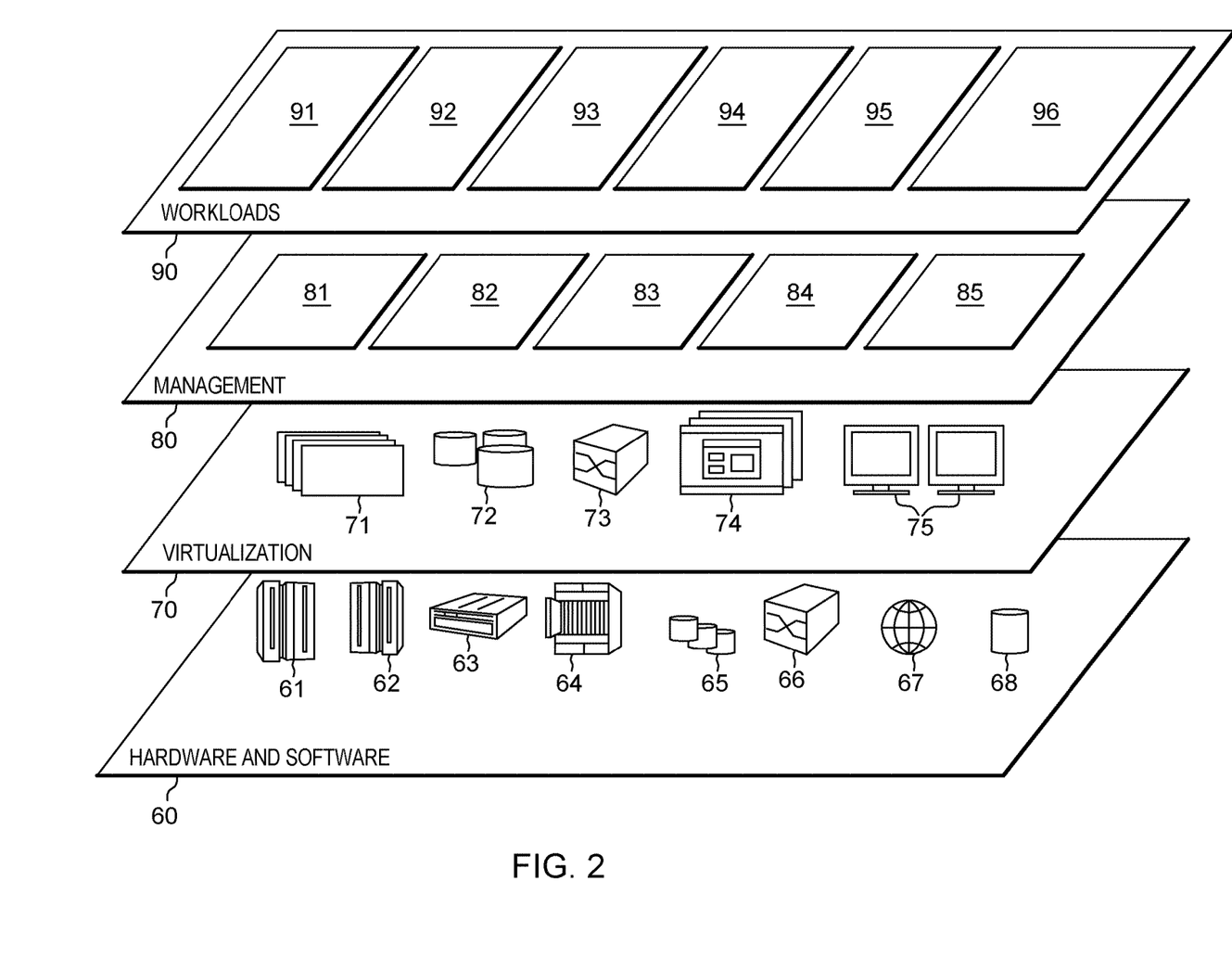
FIG. 2 depicts abstraction model layers, according to embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 include hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and team member visualization management 96.

It should be noted that the embodiments of the present invention may operate with a user's permission. Any data may be gathered, stored, analyzed, etc., with a user's consent. In various configurations, at least some of the embodiments of the present invention are implemented into an opt-in application, plug-in, etc., as would be understood by one having ordinary skill in the art upon reading the present disclosure.

Figure 3:
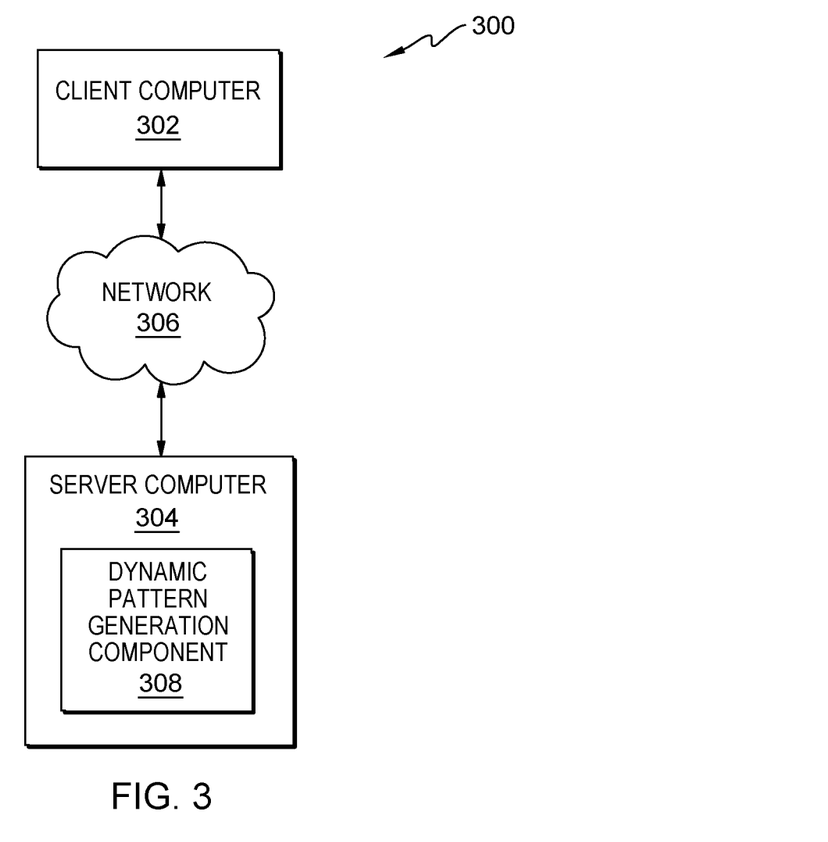
FIG. 3 is a high-level architecture, according to embodiments of the present invention.
Figure 4:
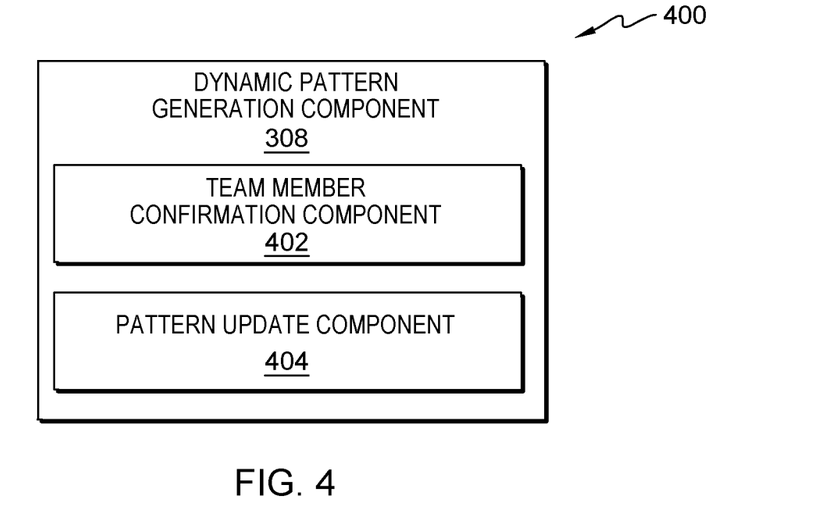
FIG. 4 is an exemplary detailed architecture, according to embodiments of the present invention.
Figure 5:
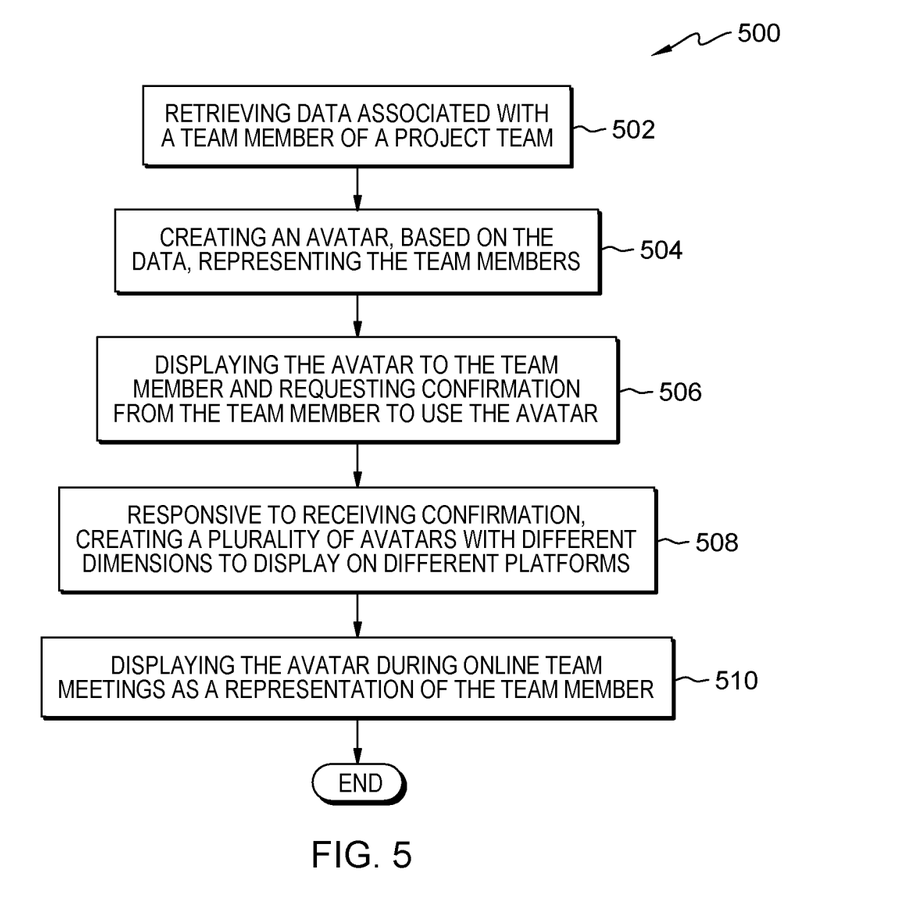
FIG. 5 is a flowchart of a method, according to embodiments of the present invention.

FIG. 3 is a high-level architecture for performing various operations of FIG. 5, in accordance with various embodiments. The architecture 300 may be implemented in accordance with the present invention in any of the environments depicted in FIGS. 1-4, among others, in various embodiments. Of course, more or less elements than those specifically described in FIG. 3 may be included in architecture 300, as would be understood by one of ordinary skill in the art upon reading the present descriptions.

Each of the steps of the method 500 (described in further detail below) may be performed by any suitable component of the architecture 300. A processor, e.g., processing circuit(s), chip(s), and/or module(s) implemented in hardware and/or software, and preferably having at least one hardware component may be utilized in any device to perform one or more steps of the method 500 in the architecture 300. Illustrative processors include, but are not limited to, a central processing unit (CPU), an application specific integrated circuit (ASIC), a field programmable gate array (FPGA), etc., combinations thereof, or any other suitable computing device known in the art.

Architecture 300 includes a block diagram, showing a storage optimization system, to which the invention principles may be applied. The architecture 300 comprises a client computer 302, a dynamic pattern generation component 308 operational on a server computer 304 and a network 306 supporting communication between the client computer 302 and the server computer 304.

Client computer 302 can be any computing device on which software is installed for which an update is desired or required. Client computer 302 can be a standalone computing device, management server, a web server, a mobile computing device, or any other electronic device or computing system capable of receiving, sending, and processing data. In other embodiments, client computer 302 can represent a server computing system utilizing multiple computers as a server system. In another embodiment, client computer 302 can be a laptop computer, a tablet computer, a netbook computer, a personal computer, a desktop computer or any programmable electronic device capable of communicating with other computing devices (not shown) within user persona generation environment via network 306.

In another embodiment, client computer 302 represents a computing system utilizing clustered computers and components (e.g., database server computers, application server computers, etc.) that act as a single pool of seamless resources when accessed within install-time validation environment of architecture 300. Client computer 302 can include internal and external hardware components, as depicted and described in further detail with respect to FIG. 5.

Server computer 304 can be a standalone computing device, management server, a web server, a mobile computing device, or any other electronic device or computing system capable of receiving, sending, and processing data. In other embodiments, server computer 304 can represent a server computing system utilizing multiple computers as a server system. In another embodiment, server computer 304 can be a laptop computer, a tablet computer, a netbook computer, a personal computer, a desktop computer, or any programmable electronic device capable of communicating with other computing devices (not shown) within install-time validation environment of architecture 300 via network 306.

Network 306 can be, for example, a local area network (LAN), a wide area network (WAN) such as the Internet, or a combination of the two, and can include wired, wireless, or fiber optic connections. In general, network 306 can be any combination of connections and protocols that will support communications between client computer 302 and server computer 304.

In one embodiment of the present invention, dynamic pattern generation component 308, operational on server computer 304, can create a rating of how well team member personalities match. It should be noted that a team member must provide consent to the use of these embodiments before use and must provide preferences to create an anonymized token.

In another embodiment of the present invention, dynamic pattern generation component 308 can create a visual representation of a team member from insights and patterns based on gathered data. In another aspect of an embodiment, dynamic pattern generation component 308 can invoke personality and behavior tests, e.g., a Myers-Briggs test, to foster a deeper mutual understanding between team members. In another aspect of an embodiment of the present invention, dynamic pattern generation component 308 can create a team community and a common language between team members through pattern creation. Dynamic pattern generation component 308 can attach a visual based on a team member personality while creating a common ground for team member interaction. Dynamic pattern generation component 308 can provide insights and metrics for a team member to understand how they work, grow, and collaborate with other team members.

Other aspects of dynamic pattern generation component 308 can include, but are not limited to, providing tests related to personality and behavior, e.g., a Myers-Briggs standardized personality test can be taken by a team to create a persona. Further, dynamic pattern generation component 308 can analyze historical data such as, but not limited to, feedback from past and present team members, past team project success ratings, and supplementary documentation to gather sentiment of a team member's persona characteristics.

In another aspect of an embodiment, dynamic pattern generation component 308 can process the results from the previously described tests to assist in searching for an illustrative visual background, e.g., an avatar, to represent the team member. Dynamic pattern generation component 308 can utilize artificial intelligence (AI) to compile test results. Dynamic pattern generation component 308 can then use machine learning to update the avatar for the team member. It should be noted that the avatar is not limited to a representation of a person, e.g., the avatar can be an abstract object, an animal, scenery, etc. It should be noted that dynamic pattern generation component 308 can create avatars based on combining different avatars associated with different personas and characteristics. In another aspect of an embodiment, the avatars can initially be created by hand or can be generated by dynamic pattern generation component 308 to create a continuous visual language for a set of patterns. It should further be noted that characteristics can range from happy, extroverted, introverted, excited, nervous, calm, quick on their feet, based on reactions to other personas, etc.

In another aspect of an embodiment, dynamic pattern generation component 308 can determine which avatar to use through an avatar template library. Further, dynamic pattern generation component 308 can compile collective insight of similar and contrasting personalities of other users through AI to determine a best fit avatar or avatar combination.

In another aspect of an embodiment, dynamic pattern generation component 308 can scan a team member's physical features by taking a picture or choosing a pre-existing picture to individualize the pattern. Dynamic pattern generation component 308 can use capabilities such as, but not limited to, facial recognition and pre-determined facial points to construct a facial feature mapping of a team member's face. Further, dynamic pattern generation component 308 can determine if the selected image has suitable parameters such as, but not limited to a white background and a clear photograph and/or a team member can add a custom illustration or image of their choosing. In another aspect of an embodiment, dynamic pattern generation component 308 can provide an avatar to a team member in various dimensions for use on different platforms.

In another aspect of an embodiment, dynamic pattern generation component 308 can receive team feedback, team synergy, speech patterns, and further analysis from a team member's current project(s). It should be noted that a team member can supplement the avatar generated by dynamic pattern generation component 308 based on providing documentation. Further, dynamic pattern generation component 308 can use machine learning to create similar groups between individuals who have "X" type of document and "X" type of persona. It should be noted that the type of persona can be learned from listening and observing through sound recognition and vocal recognition of a team member to determine the team member's tone and mood. In another aspect, dynamic pattern generation component 308 can recommend changes based on the learned insights and team members can retake personality tests.

In another aspect of an embodiment, dynamic pattern generation component 308 can incorporate characteristic shifts such as, but not limited to, team member emotion, team member reactions to images, team member reactions to situations, team member vocal queues, team member mood shifts, team member emotional responses, team member reaction to feedback, how often a team member is in a particular mood, and how a team member reacts to other personas. It should be noted that dynamic pattern generation component 308 provides the capability to resize avatars based on pre-created dimension templates.

In one aspect of an embodiment, dynamic pattern generation component 308 can use machine learning to create similar groups between team members having matching documentation types and matching personas. It should be noted that the data associated with determining a match can be obtained from listening and observing team members based on sound recognition and vocal recognition of team members to determine team member tone and mood. Further, dynamic pattern generation component 308 can recommend changes through the learned insights.

In another aspect, dynamic pattern generation component 308 can review personality tests retaken by team members and can analyze characteristic shifts such as shifts in team member emotion, team member reactions to images, team member reactions to situations, team member vocal queues, team member mood shifts, team member emotional responses, team member reactions to feedback, how often team members are in particular moods, and how team members react to other personas with respect to past personality tests.

In another aspect of an embodiment, dynamic pattern generation component 308 can provide emotional recognition. Dynamic pattern generation component 308 can access meetings and recordings of team member voices and analyze the recordings to recognize various team member emotions. It should be noted that speech patterns associated with the recordings can be filtered through AI and machine learning.

FIG. 4 is an exemplary detailed architecture for performing various operations of FIG. 5, in accordance with various embodiments. The architecture 400 may be implemented in accordance with the present invention in any of the environments depicted in FIGS. 1-3 and 5, among others, in various embodiments. Of course, a different number of elements than those specifically described in FIG. 4 may be included in architecture 400, as would be understood by one of skill in the art upon reading the present descriptions.

Each of the steps of the method 500 (described in further detail below) may be performed by any suitable component of the architecture 400. A processor, e.g., processing circuit(s), chip(s), and/or module(s) implemented in hardware and/or software, and preferably having at least one hardware component, may be utilized in any device to perform one or more steps of the method 500 in the architecture 400. Illustrative processors include, but are not limited to, a central processing unit (CPU), an application specific integrated circuit (ASIC), a field programmable gate array (FPGA), etc., combinations thereof, or any other suitable computing device known in the art.

Architecture 400 provides a detailed view of at least some of the modules of architecture 300. Architecture 400 can comprise a dynamic pattern generation component 308, which can further comprise a team member confirmation component 402 and a pattern update component 404.

In one aspect of an embodiment of the present invention, team member confirmation component 402 can provide the capability for team members to allow access to the required personal information and to approve the avatar generated by dynamic pattern generation component 308. It should be noted that dynamic pattern generation component 308 can generate the team member avatar from both a template library and from information provided manually from the team member. It should further be noted that the avatar selected by dynamic pattern generation component 308 is based on personality and behavior tests taken by the team member and by direct observation of the team member. It should be noted that a picture of the team member can be taken or provided by the team member as a basis for avatar creation by dynamic pattern generation component 308.

In another aspect of an embodiment, once dynamic pattern generation component 308 has created a team member avatar, a series of avatars of different dimensions, based on identified platforms expected to use an avatar, for approval by the team member. The team member can, through team member confirmation component 402, can approve all or a portion of the avatars and the unapproved avatars will be adjusted by dynamic pattern generation component 308 and/or the team member to create an approved set of avatars.

In another aspect of an embodiment of the present invention, pattern update component 404 can provide the capability to receive team member feedback, team member synergy, and team member speech patterns from team member current projects and use this information to update their avatar. In one aspect, a team member can interact with pattern update component 404 and, through a series of prompts, can determine that their persona has shifted. In another aspect, the team member can read the factors that have changed and can confirm or deny both the accuracy of these changes and their use by pattern update component 404. It should be noted that once the avatar is in use, pattern update component 404 will begin developing emotional recognition of the associated team member and the avatar will update according to the team member's detected emotional shifts.

In another aspect of an embodiment of the present invention, pattern update component 404 can evolve a specialized avatar for a team member. It should be noted that the avatar can be specialized to the team member's associated company and can be specialized based on the team member's observed characteristics and emotions. In another aspect, an avatar can slowly evolve as more insights of a team member are gathered. The pattern update component 404 can recognize emotions and behavioral changes based on emotional changes.

FIG. 5 is an exemplary flowchart of a method 500 for creating team member avatars for team members on a project team. At step 502, an embodiment can retrieve, via dynamic pattern generation component 308, data associated with a team member of a project team. At step 504, the embodiment can create, via dynamic pattern generation component 308, an avatar, based on the retrieved data, representing the team member. At step 506, the embodiment can display, via team member confirmation component 402, the avatar to the team member and request confirmation from the team member to use the avatar. At step 508, in response to receiving confirmation, the embodiment can create, via pattern update component 404, a plurality of avatars with different dimensions to display on different platforms. At step 510, the embodiment can display, via dynamic pattern generation component 308, the avatar during online team meetings as a representation of the associated team member.

Figure 6:
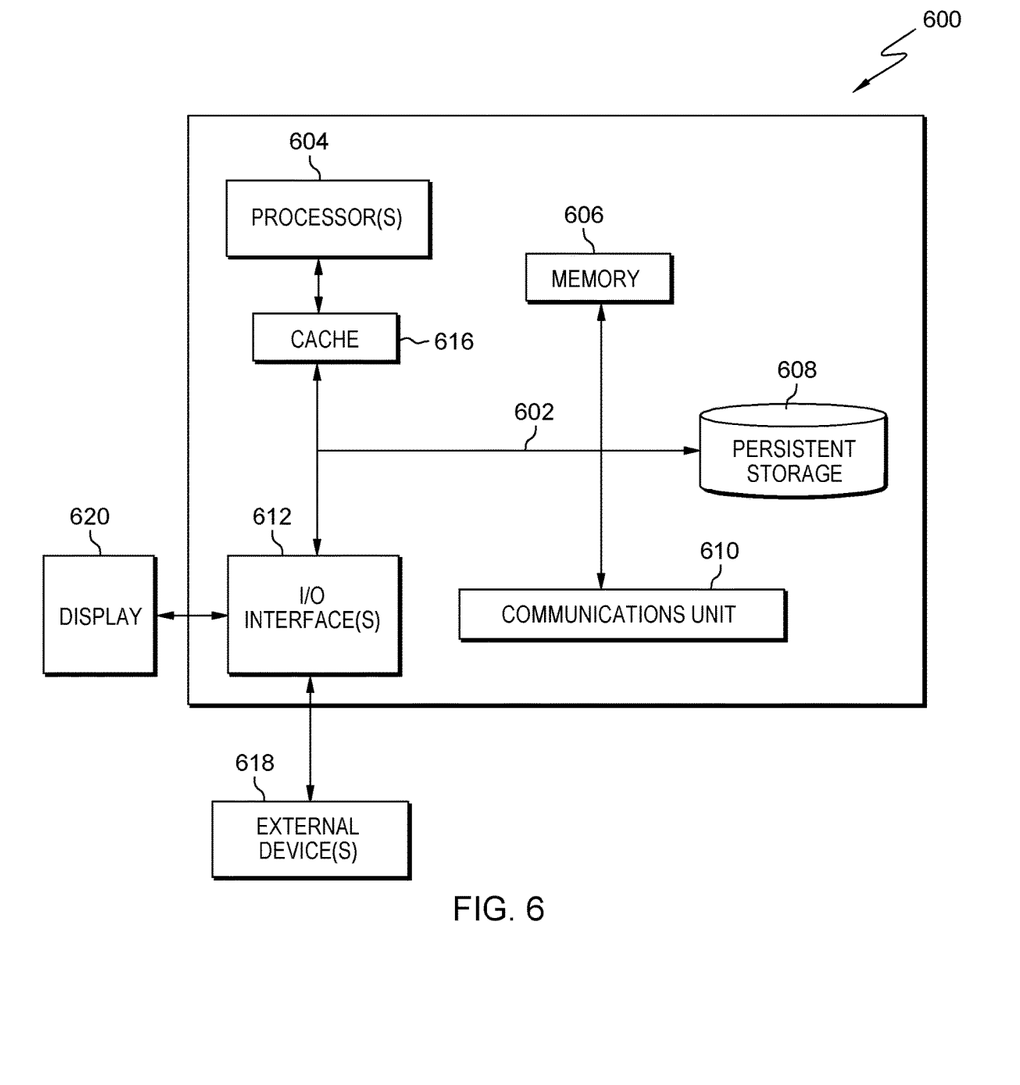
FIG. 6 is a block diagram of internal and external components of a data processing system in which embodiments described herein may be implemented, according to embodiments of the present invention.

FIG. 6 depicts computer system 600, an example computer system representative of client computer 302 and server computer 304. Computer system 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Computer system 600 includes processors 604, cache 616, memory 606, persistent storage 608, communications unit 610, input/output (I/O) interface(s) 612 and communications fabric 602. Communications fabric 602 provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of processors 604 by holding recently accessed data, and data near recently accessed data, from memory 606.

Program instructions and data used to practice embodiments of the present invention may be stored in persistent storage 608 and in memory 606 for execution by one or more of the respective processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to display 620.

Display 620 provides a mechanism to display data to a user and may be, for example, a computer monitor.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for creating a team member avatar, the computer-implemented method comprising:
   retrieving, by one or more processors, data associated with a team member;
   creating, by the one or more processors, an avatar, based on the data, representing the team member, wherein a face of the avatar is based on a facial feature mapping of the team member;
   displaying, by the one or more processors, the avatar to the team member and requesting confirmation from the team member to use the avatar as a representation of the team member;
   responsive to receiving confirmation to use the avatar, creating, by the one or more processors, a plurality of avatar representations with different dimensions to display on different platforms, respectively;
   displaying, by the one or more processors, the avatar during online team meetings as a representation of the team member;
   supplementing, by the one or more processors and machine learning process, the avatar by creating similar groups between team members who exhibit a type of documentation and a type of persona;
   creating, by the one or more processors, an updated avatar based on observations of changing characteristics of the team member;
   displaying, by the one or more processors, the updated avatar to the team member and requesting confirmation from the team member to use the updated avatar as a representation of the team member; and
   responsive to receiving confirmation to use the updated avatar, replacing, by the one or more processors, the avatar with the updated avatar.

2. The computer-implemented method of claim 1, further comprising:
   evolving, by the one or more processors, the avatar based on recognized emotions and behavioral changes to the team member.

3. The computer-implemented method of claim 2, wherein the characteristics comprise emotions, reactions to images, reactions to situations, vocal queues, mood change, emotional responses, reaction to feedback, reaction to team member personas and rate of mood change.

4. The computer-implemented method of claim 3, wherein the team member can select characteristics to include in creating the updated avatar.

5. The computer-implemented method of claim 1, wherein the data comprises an avatar template library.

6. The computer-implemented method of claim 5, wherein the data further comprises a picture of the team member.

7. The computer-implemented method of claim 1, wherein the data comprises results of personality tests and behavior tests.

8. A computer program product on one or more non-transitory computer readable storage media for creating a team member avatar, the computer program product comprising:
   program instructions to retrieve data associated with a team member;
   program instructions to create an avatar, based on the data, representing the team member, wherein a face of the avatar is based on a facial feature mapping of the team member;

program instructions to display the avatar to the team member and request confirmation from the team member to use the avatar as a representation of the team member;

responsive to receiving confirmation to use the avatar, program instructions to create a plurality of avatar representations with different dimensions to display on different platforms, respectively;

program instructions to display the avatar during online team meetings as a representation of the team member;

program instructions to supplement, by machine learning process, the avatar by creating similar groups between team members who exhibit a type of documentation and a type of persona;

program instructions to creating an updated avatar based on observations of changing characteristics of the team member;

program instructions to display the updated avatar to the team member and requesting confirmation from the team member to use the updated avatar as a representation of the team member; and responsive to receiving confirmation to use the updated avatar, program instructions to replace the avatar with the updated avatar.

9. The computer program product on the one or more non-transitory computer readable storage media of claim 8, further comprising:

program instructions to evolve the avatar based on recognized emotions and behavioral changes to the team member.

10. The computer program product on the one or more non-transitory computer readable storage media of claim 9, wherein the characteristics comprise emotions, reactions to images, reactions to situations, vocal queues, mood change, emotional responses, reaction to feedback, reaction to team member personas and rate of mood change.

11. The computer program product on the one or more non-transitory computer readable storage media of claim 10, wherein the team member can select characteristics to include in creating the updated avatar.

12. The computer program product on the one or more non-transitory computer readable storage media of claim 8, wherein the data comprises an avatar template library.

13. The computer program product on the one or more non-transitory computer readable storage media of claim 12, wherein the data further comprises a picture of the team member.

14. The computer program product on the one or more non-transitory computer readable storage media of claim 8, wherein the data comprises results of personality tests and behavior tests.

15. A computer system for creating a team member avatar, the computer system comprising:
one or more computer processors;
one or more non-transitory computer readable storage media; and
program instructions stored on the one or more non-transitory computer readable storage media, the program instructions comprising:
program instructions to retrieve data associated with a team member;
program instructions to create an avatar, based on the data, representing the team member, wherein a face of the avatar is based on a facial feature mapping of the team member;
program instructions to display the avatar to the team member and request confirmation from the team member to use the avatar as a representation of the team member;
responsive to receiving confirmation to use the avatar, program instructions to create a plurality of avatar representations with different dimensions to display on different platforms, respectively;
program instructions to display the avatar during online team meetings as a representation of the team member;
program instructions to supplement, by machine learning process, the avatar by creating similar groups between team members who exhibit a type of documentation and a type of persona;
program instructions to creating an updated avatar based on observations of changing characteristics of the team member;
program instructions to display the updated avatar to the team member and requesting confirmation from the team member to use the updated avatar as a representation of the team member; and
responsive to receiving confirmation to use the updated avatar, program instructions to replace the avatar with the updated avatar.

16. The computer system of claim 15, further comprising:
program instructions to evolve the avatar based on recognized emotions and behavioral changes to the team member.

17. The computer system of claim 16, wherein the characteristics comprise emotions, reactions to images, reactions to situations, vocal queues, mood change, emotional responses, reaction to feedback, reaction to team member personas and rate of mood change and wherein the team member can select characteristics to include in creating the updated avatar.

18. The computer system of claim 15, wherein the data comprises an avatar template library.

19. The computer system of claim 18, wherein the data further comprises a picture of the team member.

20. The computer system of claim 15, wherein the data comprises results of personality tests and behavior tests.

* * * * *